(12) United States Patent
She

(10) Patent No.: US 11,316,609 B2
(45) Date of Patent: Apr. 26, 2022

(54) DATA TRANSMITTING METHOD, DATA RECEIVING METHOD, AND DEVICE

(71) Applicant: WANGSU SCIENCE & TECHNOLOGY CO., LTD., Shanghai (CN)

(72) Inventor: Jiangning She, Shanghai (CN)

(73) Assignee: WANGSU SCIENCE & TECHNOLOGY CO., LTD., Shanghai (CN)

( * ) Notice: Subject to any disclaimer, the term of this patent is extended or adjusted under 35 U.S.C. 154(b) by 909 days.

(21) Appl. No.: 16/071,725

(22) PCT Filed: Feb. 27, 2018

(86) PCT No.: PCT/CN2018/077432
§ 371 (c)(1),
(2) Date: Jul. 20, 2018

(87) PCT Pub. No.: WO2019/148563
PCT Pub. Date: Aug. 8, 2019

(65) Prior Publication Data
US 2021/0203434 A1 Jul. 1, 2021

(30) Foreign Application Priority Data
Jan. 30, 2018 (CN) .......................... 201810090042.7

(51) Int. Cl.
*H04J 3/26* (2006.01)
*H04L 1/00* (2006.01)
(Continued)

(52) U.S. Cl.
CPC .......... *H04L 1/0002* (2013.01); *H04L 1/1685* (2013.01); *H04L 43/0829* (2013.01); *H04L 47/32* (2013.01); *H04L 47/34* (2013.01)

(58) Field of Classification Search
CPC ... H04L 1/0002; H04L 1/0015; H04L 1/1685; H04L 1/1848; H04L 1/1854;
(Continued)

(56) References Cited

U.S. PATENT DOCUMENTS 6,112,323 A * 8/2000 Meizlik ................. H04L 1/0002
714/748
6,381,215 B1 * 4/2002 Hamilton .............. H04L 1/0002
370/236

(Continued)

FOREIGN PATENT DOCUMENTS

CN 106330414 A 1/2017
CN 106533963 A 3/2017
CN 106936661 A 7/2017

OTHER PUBLICATIONS

The European Patent Office (EPO) The Extended European Search Report for 18769942.6, Jul. 19, 2019 6 Pages.
(Continued)

*Primary Examiner* — Phuc H Tran

(57) ABSTRACT

A data transmitting method, includes: generating, by a first device, data messages based on a to-be-sent data stream; transmitting, by the first device, the data messages to a second device based on a packet transmission rate; recording, by the first device, the number of transmitted data messages; when the number of the transmitted data messages reaches a preset number for one batch, transmitting, by the first device, a verification message to the second device; receiving, by the first device, a verification acknowledgement returned by the second device, and determining, by the second device, a packet loss rate of the batch of data messages; updating, by the first device, the packet transmission rate based on packet loss rates of multiple batches of data messages.

16 Claims, 5 Drawing Sheets

(51) Int. Cl.
*H04L 1/16* (2006.01)
*H04L 43/0829* (2022.01)
*H04L 47/32* (2022.01)
*H04L 47/34* (2022.01)

(58) Field of Classification Search
CPC .............. H04L 1/1883; H04L 1/1887; H04L 2001/0093; H04L 47/10; H04L 47/263
See application file for complete search history.

(56) References Cited

U.S. PATENT DOCUMENTS

| | | | |
|---|---|---|---|
| 6,993,689 B2 * | 1/2006 | Nagai | H04L 1/0002 |
| | | | 375/E7.016 |
| 2008/0267077 A1 | 10/2008 | Peng et al. | |
| 2016/0057064 A1 * | 2/2016 | Appleby | H04L 47/28 |
| | | | 709/219 |
| 2019/0215102 A1 * | 7/2019 | Kai | H04L 1/00 |

OTHER PUBLICATIONS

The China National Intelleectual Property Administration (CNIPA) The China Search Report for 201810090042.7 Feb. 3, 2019 20 Pages.

* cited by examiner

DATA TRANSMITTING METHOD, DATA RECEIVING METHOD, AND DEVICE

CROSS-REFERENCES TO RELATED APPLICATIONS

This application is a national phase entry under 35 U.S.C § 371 of International Application No. PCT/CN2018/077432, filed on Feb. 27, 2018, which claims priority of Chinese Patent Application No. 201810090042.7, filed with the State Intellectual Property Office of P. R. China on Jan. 30, 2018, the entire contents of all of which are incorporated herein by reference.

FIELD OF THE DISCLOSURE

The present disclosure relates to the technical field of network communication and, more particularly, relates to a data transmitting method, a data receiving method, and a device.

BACKGROUND

As network users chase after emerging forms of entertainment such as live streaming, massive data traffic relating to live streaming is generated. The implementation of live streaming relies on the technical approach of live stream pushing. That is, a client of the host pushes the video data stream to a server of the live streaming platform, and a client of the audience acquires the video data flow from the server of the live streaming platform, such that live streaming is realized.

Because live streaming has a very high timeliness requirement on the data, the existing live stream pushing technologies are often realized based on the user datagram protocol (UDP) that has a relatively high transmission rate. However, the UDP is not a reliable transmission protocol, and when the network bandwidth fluctuates, situations such as video frame drop often occur, which affect the live streaming effects. Correspondingly, in the existing technologies, there are also some live stream pushing technologies based on the transmission control protocol (TCP). However, when the bandwidth fluctuates, such live stream pushing technologies show issues such as video lag.

BRIEF SUMMARY OF THE DISCLOSURE

The present disclosure provides a data transmitting method, a data receiving method, and a device, thereby reducing packet loss and improving the utilization rate of the network resources.

Embodiments of the present disclosure provide a data transmitting method, including:

generating, by a first device, data messages based on a to-be-sent data stream;

transmitting, by the first device, the data messages to a second device based on a packet transmission rate;

recording, by the first device, the number of transmitted data messages;

when the number of the transmitted data messages reaches a preset number to be a batch of data messages, transmitting, by the first device, a verification message to the second device;

receiving, by the first device, a verification acknowledgement returned by the second device, and determining, by the first device, a packet loss rate of the batch of data messages;

updating, by the first device, the packet transmission rate based on packet loss rates of multiple batches of data messages.

Optionally, the updating, by the first device, the packet transmission rate based on packet loss rates of multiple batches of data messages includes:

for each batch of data messages among the multiple batches of data messages, determining, by the first device, a round-trip time corresponding to the each batch of data messages based on a verification message and a verification acknowledgement to which the each batch of data messages correspond;

updating, by the first device, the packet transmission rate based on packet loss rates of certain batches of data messages among which a difference in round-trip time is within a preset value range.

Optionally, a data message includes a sending sequence number, and the verification acknowledgement includes sending sequence numbers of the batch of data messages received by the second device.

The updating, by the first device, the packet transmission rate based on packet loss rates of multiple batches of data messages includes:

based on the sending sequence numbers of the batch of data messages received by the second device in the verification acknowledgement, determining, by the first device, the number of data messages not received by the second device in the batch of data messages;

determining, by the first device, a packet loss rate of the batch of data messages based on the number of data messages not received by the second device and the preset number;

updating, by the first device, the packet transmission rate based on the packet loss rates of the multiple batches of data messages.

Optionally, the method further includes:

continuing transmitting, by the first device, a next batch of data messages, where the next batch of data messages include transmitted data messages that have not been received by the second device.

Optionally, the first device includes a sending buffer zone; and after receiving, by the first device, the verification acknowledgement returned by the second device, the method further includes:

confirming, by the first device, whether the second device has received the batch of data messages completely based on the sending sequence numbers of the batch of data messages received by the second device in the verification acknowledgement;

if the second device has received the batch of data messages completely, deleting, by the first device, the batch of data messages from the sending buffer zone.

Embodiments of the present disclosure provide a data receiving method, including:

receiving, by a second device, data messages sent by a first device;

when the second device receives a verification message sent by the first device, sending, by the second device, a verification acknowledgement to the first device.

Optionally, the second device includes a receiving buffer zone, and a data message includes a sending sequence number.

The when the second device receives a verification message sent by the first device, sending, by the second device, a verification acknowledgement to the first device, includes:

determining, by the second device, sending sequence numbers of data messages in the receiving buffer zone;

generating, by the second device, the verification acknowledgement, where the verification acknowledgement includes the sending sequence numbers of the data messages in the receiving buffer zone.

Optionally, the second device further includes a processing buffer zone, and the generating, by the second device, the verification acknowledgement, further includes:

when the receiving buffer zone caches a preset batch of data messages, transferring, by the second device, the preset batch of data messages from the receiving buffer zone to the processing buffer zone, where the preset batch of data messages are a preset number of data messages having consecutive sending sequence numbers;

performing a multithread process, by the second device, on the data messages in the processing buffer zone.

Optionally, the second device is a node server of the content delivery network (CDN), and a data message further includes an IP address of a destination node server.

The sending, by the second device, the data messages to an application server includes:

determining, by the second device, a sending domain name link based on the IP address of the destination node server, where the sending domain name link is a path formed by a plurality of node servers of the CDN in which the destination node server is an end of the path;

sending, by the second device, the data messages to the destination node server through the sending domain name link, where the destination node server is configured to send the data messages to the application server.

Embodiments of the present disclosure provide a data transmitting device, comprising:

a processing unit, configured to generate data messages based on a to-be-sent data stream;

a transceiving unit, configured to send the data messages to a second device based on a packet transmission rate;

where the processing unit is further configured to record a number of transmitted data messages;

the processing unit is further configured to, when the number of the transmitted data messages reaches a preset number to be a batch of data messages, send a verification message to the second device through the transceiving unit;

the processing unit is further configured to receive a verification acknowledgement returned by the second device through the transceiving unit, and to determine a packet loss rate of the batch of data messages;

the processing unit is further configured to update the packet transmission rate based on packet loss rates of multiple batches of data messages.

Optionally, the processing unit is configured to:

for each batch of data messages among the multiple batches of data messages, determine a round-trip time corresponding to the each batch of data messages based on a verification message and a verification acknowledgement to which the each batch of data messages correspond;

The processing unit updates the packet transmission rate based on packet loss rates of certain batches of data messages among which a difference in round-trip time is within a preset value range.

Optionally, a data message includes a sending sequence number, and the verification acknowledgement includes sending sequence numbers of the corresponding batch of data messages received by the second device.

The processing unit is configured to:

based on the sending sequence numbers of the corresponding batch of data messages received by the second device in the verification acknowledgement, determine the number of data messages not received by the second device in the corresponding batch of data messages;

determine a packet loss rate of the corresponding batch of data messages based on the number of data messages not received by the second device and the preset number;

update the packet transmission rate based on the packet loss rates of the multiple batches of data messages.

Optionally, the processing unit is further configured to:

continue transmitting a next batch of data messages, where the next batch of data messages include transmitted data messages that have not been received by the second device.

Optionally, the processing unit includes a sending buffer zone.

Optionally, the processing unit is further configured to:

confirm whether the second device has received the batch of data messages completely based on the sending sequence numbers of the batch of data messages received by the second device in the verification acknowledgement, where the preset batch of data messages are a preset number of data messages having consecutive sending sequence numbers;

if the second device has received the batch of data messages completely, delete the batch of data messages from the sending buffer zone.

Embodiments of the present disclosure provide a data receiving device, comprising:

a transceiving unit, configured to receive data messages sent by a first device, a processing unit, configured to, when the transceiving unit receives a verification message sent by the first device, send a verification acknowledgement to the first device.

Optionally, the processing unit includes a receiving buffer zone, and a data message includes a sending sequence number.

The processing unit is configured to:

determine sending sequence numbers of data messages in the receiving buffer zone;

generate a verification acknowledgement, where the verification acknowledgement includes the sending sequence numbers of the data messages in the receiving buffer zone.

Optionally, the processing unit further includes a processing buffer zone, and the processing unit is further configured to:

when data messages in the receiving buffer zone with consecutive sending sequence numbers reaches a preset number to be a batch of data messages, transfer the batch of data messages from the receiving buffer zone to the processing buffer zone;

perform a multithread process on the data messages in the processing buffer zone.

Optionally, the receiving device is a node server of the content delivery network (CDN), and a data message further includes an IP address of a destination node server.

The processing unit is further configured to:

determine a sending domain name link based on the IP address of the destination node server, where the sending domain name link is a path formed by a plurality of node servers of the CDN in which the destination node server is an end of the path;

control the transceiving unit to send the data messages to the destination node server through the sending domain name link, where the destination node server is configured to send the data messages to an application server.

Embodiments of the present disclosure provide a computing device, including: at least one processor, and a memory coupled to the at least one processor.

The memory stores instructions executable by the at least one processor, and the instructions are executed by the at least one processor to allow the at least one processor to execute any of aforementioned data transmitting methods, and/or, any of aforementioned data receiving methods.

Embodiments of the present disclosure provide a non-volatile computer-readable storage medium. The non-volatile computer-readable storage medium stores computer-executable instructions, and the computer-executable instructions are configured to enable the computer to execute any of aforementioned data transmitting methods, and/or, any of aforementioned data receiving methods.

As such, embodiments of the present disclosure provide a data transmitting method, a data receiving method, and a device. The method includes: generating, by the first device, data messages based on a to-be-sent data stream; transmitting, by the first device, the data messages to a second device based on a packet transmission rate; recording, by the first device, the number of transmitted data messages; when the number of the transmitted data messages reaches a preset number for one batch, transmitting, by the first device, a verification message to the second device; receiving, by the first device, a verification acknowledgement returned by the second device, and determining, by the second device, a packet loss rate of the batch of data messages; updating, by the first device, the packet transmission rate based on packet loss rates of multiple batches of data messages. In embodiments of the present disclosure, the first device updates the packet transmission rate based on the packet loss rates of multiple batches of the data messages. The lower the packet loss rate, the better the network condition, and the higher the packet loss rate, the poorer the network condition. Because the packet loss rate reflects the current network condition to a great extent, updating the packet transmission rate based on the packet loss rate may enable the packet transmission rate of the first device to better accommodate the fluctuation of the network bandwidth, thus reducing the occurrence of the packet loss phenomenon. Further, the first device performs verification with the second device batch by batch, which reduces the occupation of network resources in the verification process, thus increasing the network resource utilization rate.

BRIEF DESCRIPTION OF THE DRAWINGS

To more clearly illustrate technical solutions of the present disclosure, accompanying drawings used in descriptions of embodiments are briefly introduced hereinbelow. Obviously, the drawings in the following descriptions are merely some embodiments of the present disclosure, and for those ordinarily skilled in the relevant art, other drawings may be obtained from these accompanying drawings without creative labor.

DETAILED DESCRIPTION

To make the objective, technical solutions and advantages of the present disclosure clearer, embodiments of the present disclosure are described in more details with reference to the accompanying drawings. Obviously, the described embodiments are merely some embodiments of the present disclosure, but not entire embodiments. Based on embodiments of the present disclosure, all other embodiments obtainable by those ordinarily skilled in the relevant art without creative labor shall fall within the protection scope of the present disclosure.

Figure 1:
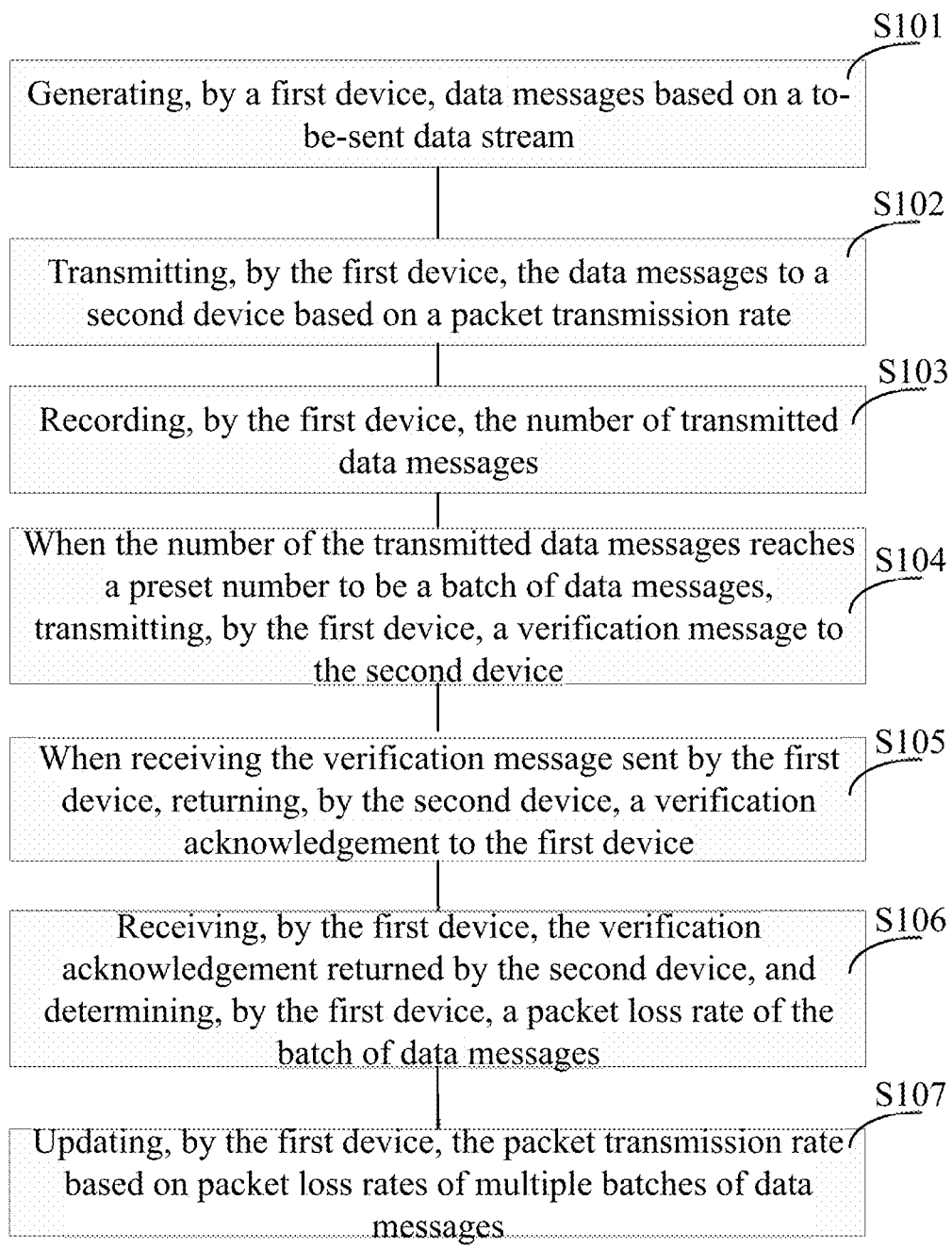
FIG. 1 illustrates a schematic view of a data transmitting and receiving method according to embodiments of the present disclosure.

FIG. 1 illustrates a schematic view of a data transmitting and receiving method according to embodiments of the present disclosure. As shown in FIG. 1, the method includes following steps:

S101: generating, by a first device, data messages based on a to-be-sent data stream;

S102: transmitting, by the first device, the data messages to a second device based on a packet transmission rate;

S103: recording, by the first device, the number of transmitted data messages;

S104: when the number of the transmitted data messages reaches a preset number to be a batch of data messages, transmitting, by the first device, a verification message to the second device;

S105: when receiving the verification message sent by the first device, returning, by the second device, a verification acknowledgement to the first device;

S106: receiving, by the first device, the verification acknowledgement returned by the second device, and determining, by the first device, a packet loss rate of the batch of data messages;

S107: updating, by the first device, the packet transmission rate based on packet loss rates of multiple batches of data messages.

In specific implementation, the first device may be a data transmitting end, and the second device may be a data receiving end. The first device and the second device may realize data transmitting and receiving through the Internet. The data stream sent by the first device to the second device may be a data stream of a given data amount, such as an album and a recorded video program, or may be a data stream of an unknown data amount, such as live streaming video data. The disclosed method may be implemented by embedding the software development kit (SDK) in the first device and/or the second device. The operating system of the first device and/or the second device may be popular operating systems such as Linux, Windows, Mac OS, IOS, or Android.

At S101, the data stream is sent by the first device to the second device in the form of data packets. Specifically, the first device packs a certain amount of streaming data into data packets, and encapsulates the data packets into data messages for sending to the second device. Optionally, the first device fills the data messages with streaming data, such that each data message can carry as much streaming data as possible, which reduces the total number of data messages.

At S103 and S104, the first device confirms whether the amount of transmitted data messages reaches a preset number to be a batch (of data messages). Optionally, each time the amount of transmitted data messages reaches the preset number to be one batch of data messages, the first device sends a verification message to the second device, and meanwhile the first device may start to re-count the number of transmitted data messages. For example, the preset number for one batch may be 128. When the amount of transmitted data messages recorded by the first device reaches 128, the first device sends a verification message to the second device, and meanwhile the first device re-counts from 1. Optionally, the verification message may carry streaming data, thereby reducing the round-trip time (RTT). Further, the first device may send other packets to the second device, such as a request packet for establishing a connection, and a control command occupies little space of such packets. Further, the rest space of these packets may be utilized to carry streaming data. It should be understood that, when the verification message also carries video streaming data, the verification message corresponds to 1 when the first device starts to re-count.

At S105, after receiving the verification message, the second device may query the condition of received data messages. Optionally, the second device only queries the condition of data messages received during a period between a previously received verification message and a currently received verification message, and the second device generates and sends a verification acknowledgement to the second device based on the condition of the data messages received during such period.

At S106, after the first device receives the verification acknowledgement returned by the second device, the first device may determine a receiving condition of the corresponding batch of data messages by the second device based on the verification acknowledgement, thus determining a packet loss rate of the corresponding batch of data messages.

At S107, the first device updates the packet transmission rate based on packet loss rates of multiple batches of the data messages. It should be understood that, the packet transmission rate at S102 may also be acquired by the approach illustrated at S107. The multiple batches of data messages herein may refer to a plurality of batches of data messages sent by the first device consecutively. In the specific implementation, the first device may acquire an average packet loss rate based on the packet loss rates of the multiple batches of data messages, and update the packet transmission rate based on the average packet loss rate, thereby excluding the misjudgement caused by occasional network jitter. Obviously, the first device may update the packet transmission rate based on the central value of the packet loss rates of the multiple batches of the data messages. Specific implementations may depend on practical application scenarios, and the present disclosure is not intended to be limiting.

Optionally, updating, by the first device, the packet transmission rate based on packet loss rates of multiple batches of data messages includes: for each batch of data messages among multiple batches of data messages, determining, by the first device, a round-trip time corresponding to the batch of data messages based on the verification message and the verification acknowledgement that the batch of data messages correspond; and updating, by the first device, the packet transmission rate based on packet loss rates of certain batches of data messages among which a difference in round-trip time is within a preset value range. By determining the round-trip time, the packet loss rate(s) under certain special conditions may be excluded to avoid the misjudgement caused by occasional network jitter, which enables the updated packet transmission rate to better accommodate the condition of network bandwidth. Further, with respect to the conventional approach of determining the current network condition through RTT, embodiments of the present disclosure rely on the packet loss rate to prevent the occurrence of situations where the network condition is misjudged due to too many data messages received by the second device at the same time, since RTT can only roughly determine the congestion condition of the current network but cannot determine the utilization rate of the current bandwidth. Thus, by using the packet loss rate to update the packet transmission rate, the updated packet transmission rate may better accommodate the condition of network bandwidth.

Optionally, the first device may determine the packet loss rates of a plurality of consecutive batches of data messages, and if the difference between packet loss rates of the plurality of consecutive batches of data messages does not exceed a preset threshold, it is indicated that the packet loss rates of the plurality of consecutive batches of data messages can reflect the current network condition. Further, the average packet loss of the plurality of consecutive batches of data messages may be acquired. When the average packet loss rate is higher than a first threshold, the first device may reduce the packet transmission rate, and when the average packet loss rate is lower than a second threshold, the first device may increase the packet transmission rate. If among the plurality of consecutive batches of data messages, there are minority batches of data messages having packet loss rates significantly different from packet loss rates of other majority batches of data messages, the average data message loss rate may be determined based on the majority batches of data messages. Further, the packet transmission rate may be updated based on the average packet loss rate, thereby excluding the misjudgement caused by occasional network jitter. For example, the first threshold may be 0.5, and packet loss rates of three batches of data messages may be 0.1, 0.9, and 0.1, respectively. If the average packet loss rate is calculated directly, the calculation result may be 0.37, and it is expected that the first device is going to reduce the packet transmission rate. However, the packet loss rate of the second batch of data messages being 0.9 may highly likely be caused by network jitter, which cannot reflect deterioration of the network condition. Under this situation, if the packet transmission rate is reduced, the bandwidth resource may be wasted. Thus, the second batch of data messages having the packet loss rate of 0.9 may need to be excluded for calculation, and the average packet loss rate may thus be 0.1. Thus, it is determined that the first device does not need to reduce the packet transmission rate, which prevent the bandwidth resources from being wasted.

In embodiments of the present disclosure, the first device updates the packet transmission rate based on the packet loss rates of multiple batches of the data messages. The lower the packet loss rate, the better the network condition, and the higher the packet loss rate, the poorer the network condition. Because the packet loss rate reflects the current network condition to a great extent, based on the packet loss rate, the packet transmission rate may be updated to adjust the packet transmission rate of the first device to better accommodate the fluctuation of the network bandwidth, thus reducing the occurrence of the packet loss phenomenon. Further, the first device may perform verification with the second device batch by batch, which reduces the occupation of network resources in the verification process, thus increasing the network resource utilization rate.

In the data transmitting method provided by embodiments of the present disclosure, the first device may need to update the packet transmission rate based on the packet loss rates of multiple batches of data messages. Optionally, a data message may include a sending sequence number, and the sending sequence numbers of the consecutively transmitted data messages may vary consecutively based on the transmission order of the data messages. After receiving a verification message, the second device may send back a verification acknowledgement to the first device, where the verification acknowledgement includes sending sequence numbers of the corresponding batch of data messages received by the second device. The updating, by the first device, the packet transmission rate based on packet loss rates of multiple batches of data messages further includes: based on the sequence numbers of the corresponding batch of data messages received by the second device in the verification acknowledgement, determining, by the first device, the number of data messages not received by the second device in the corresponding batch of data messages; determining, by the first device, a packet loss rate of the corresponding batch of data messages based on the number of data messages not received by the second device and the preset number; updating, by the first device, the packet transmission rate based on the packet loss rates of the multiple batches of data messages. After receiving the verification acknowledgement, the first device may determine, among the batch of data messages, the sending sequence numbers of data messages received by the second device. Because the sequence numbers of consecutively transmitted data messages are consecutive, the first device may determine, among the batch of data messages, the sending sequence numbers of data messages not received by the second device by querying the sending sequence numbers of data messages received by the second device. Accordingly, the number of data messages not received by the second device may be further determined. Because the first device sends a verification message per batch based on the preset number, after determining the number of data messages not received by the second device, the packet loss rate may be determined directly based on the present number. Similarly, after receiving a verification message, the second device no longer needs to query the exact batch of data messages that are to be verified by the verification message. Instead, the second device queries the sequence numbers of the data messages received during the period between a moment of previously receiving the verification message and a current moment, and the second device further sends these sending sequence numbers to the first device, which reduces the querying pressure of the second device.

Optionally, the first device may continue to send a next batch of data messages, where the next batch of data messages include transmitted data messages that have not been received by the second device. The first device may, based on the sending sequence numbers of the data messages received by the second device in the verification acknowledgement, determine the sending sequence numbers of the data messages not received by the second device. Thus, in the next batch of data messages, the sending sequence numbers of the data messages not received by the second device may be re-sent. It should be understood that, after sending the verification acknowledgement, the first device may not stop transmitting data messages. Thus, after a verification acknowledgement of a certain batch of data messages is sent and before the sending sequence numbers of data messages among the certain batch that are not received by the second device are determined, additional batches of data messages may be transmitted. The next batch herein refers to a batch of data messages that is next to the batch of data messages transmitted when the sending sequence numbers of the data messages not received by the second device are determined. For example, the first device may send out A, a, B, b, C, and c to the second device sequentially, where A, B, and C represent a batch of data messages, respectively, and a, b, and c represent a verification message corresponding to each batch, respectively. Assume after transmitting a batch A of data messages to the second device, the first device sends a verification message a to the second device and continues transmitting a batch B of data messages. The first device may, after receiving a verification acknowledgement of the verification message a returned by the second device, determine the data messages in the batch A that are not received by the second device. Under this situation, if the first device is transmitting the batch B, the first device may add the data messages in the batch A that are not received by the second device to the batch C.

Optionally, the first device includes a sending buffer zone, and after receiving, by the first device, the verification acknowledgement returned by the second device, the method further includes: confirming, by the first device, whether the second device has received the batch of data messages completely based on the sending sequence numbers of the batch of data messages received by the second device in the verification acknowledgement; if the second device has received the batch of data messages completely, deleting, by the first device, the batch of data messages from the sending buffer zone. The preset batch of data messages may be a preset number of data messages with consecutive sequence numbers. For example, the preset number may be 128, and each time the first device transmits 128 data messages, confirmation is performed. Because the first device may re-transmit certain data messages, the sending sequence numbers of the data messages in each batch that are transmitted by the first device may not be consecutive. Assume the first device transmits a first batch of data messages and the sending sequence numbers of the transmitted data messages are 1~128, a verification message may be sent. The sending sequence numbers included in the verification acknowledgement received by the first device may be 1~100, indicating that the second device have not received the data messages with the sending sequence numbers of 101~128. Under this situation, the sending buffer zone of the first device may cache the data messages with the sending sequence numbers of 101~128, and the first device may directly acquire the data messages with the sending sequence numbers of 101~128 for re-transmitting in the next batch. Assume the next batch is the third batch of data messages transmitted by the first device, the sending sequence numbers of the third batch of data messages may be 101~128, and 257~357. Under this situation, the sending buffer zone of the first device may still cache the data messages with the sending sequence numbers of 1~128. Only when confirming that the data messages with sending sequence numbers of 1~128 are fully received by the second device upon receiving a certain verification acknowledgement, the first device may delete the data messages with the sending sequence numbers of 1~128 from the sending buffer zone. In the aforementioned specific implementations, a preset batch of data messages may refer to the data messages with sending sequence numbers of 1~128, the data messages with sending sequence numbers of 129~256, or the data messages with sending sequence numbers of 257~384, etc.

Optionally, the second includes a receiving buffer zone, and a data message received by the second device may first be cached in the receiving buffer zone. When receiving a verification message transmitted by the first device, the second device may determine the sending sequence numbers of the data messages in the receiving buffer zone, and generate a verification acknowledgement. The verification acknowledgement includes sending sequence numbers of the data messages in the receiving buffer zone. Optionally, the second device only determines the sending sequence numbers of the data messages received during a period between previously receiving a verification message and a current moment, and generates a verification acknowledgement, thereby reducing the operation pressure of the second device. Optionally, the second device may inform the first device about the remaining space in the receiving buffer zone, and the first device may adjust the size of each data message dynamically based on the remaining space in the receiving buffer zone. Accordingly, the utilization rate of the data messages and the receiving buffer zone may be improved, and the situation in which the data messages cannot be fully received due to a too small remaining space of the receiving buffer zone may be prevented.

Optionally, when the receiving buffer zone caches a preset batch of data messages, the second device may transfer the preset batch of data messages from the receiving buffer zone to a processing buffer zone, where the preset batch of data messages are a preset number of data messages having consecutive sending sequence numbers; and the second device may perform a multithread process on the data messages in the processing buffer zone. Similar to the first device, the second device may remove data messages from the receiving buffer zone based on preset batches, thereby ensuring that the second device can fully receive the entire data messages. Further, by performing a multithread process on the data messages in the processing buffer zone, the capability of the second device in processing the data messages may be improved. Further, in the second device, a specialized processor may be included for data receiving and processing, to reduce the cost of system scheduling and improving the hit rate of the cache of the processor.

Optionally, the first device may adjust the size of the sending buffer zone dynamically based on the packet loss rate, and an adjustment command may be transmitted to the second device. After receiving the adjustment command, the second device may correspondingly adjust the size of the receiving buffer zone. Often, the size of the sending buffer zone needs to be consistent with the size of the receiving buffer zone. Optionally, when the packet loss rate is low, the sizes of the sending buffer zone and the receiving buffer zone may be increased, such that the first device may send data messages consecutively and the second device may receive data messages consecutively. More specifically, the first device may send data messages in the sending buffer zone based on the packet transmission rate, and when the packet transmission rate is relatively high, if the sending buffer zone is too small, the situation in which the first device has no data message to send may occur, which causes the waste of bandwidth resources. Based on similar principles, when the receiving buffer zone of the second device is too small, the bandwidth resource may also be wasted. Optionally, when the packet loss rate is relatively high, the first device may gradually decrease the size of the sending buffer zone based on a two-step approach, and the first device may send an adjustment command to the second device to instruct the second device to correspondingly adjust the size of the receiving buffer zone. The gradual decrease in the sizes of the sending buffer zone and the receiving buffer zone may reduce the waste of the bandwidth resource that is caused by over reduction of the sending buffer zone and the receiving buffer zone.

Figure 2:
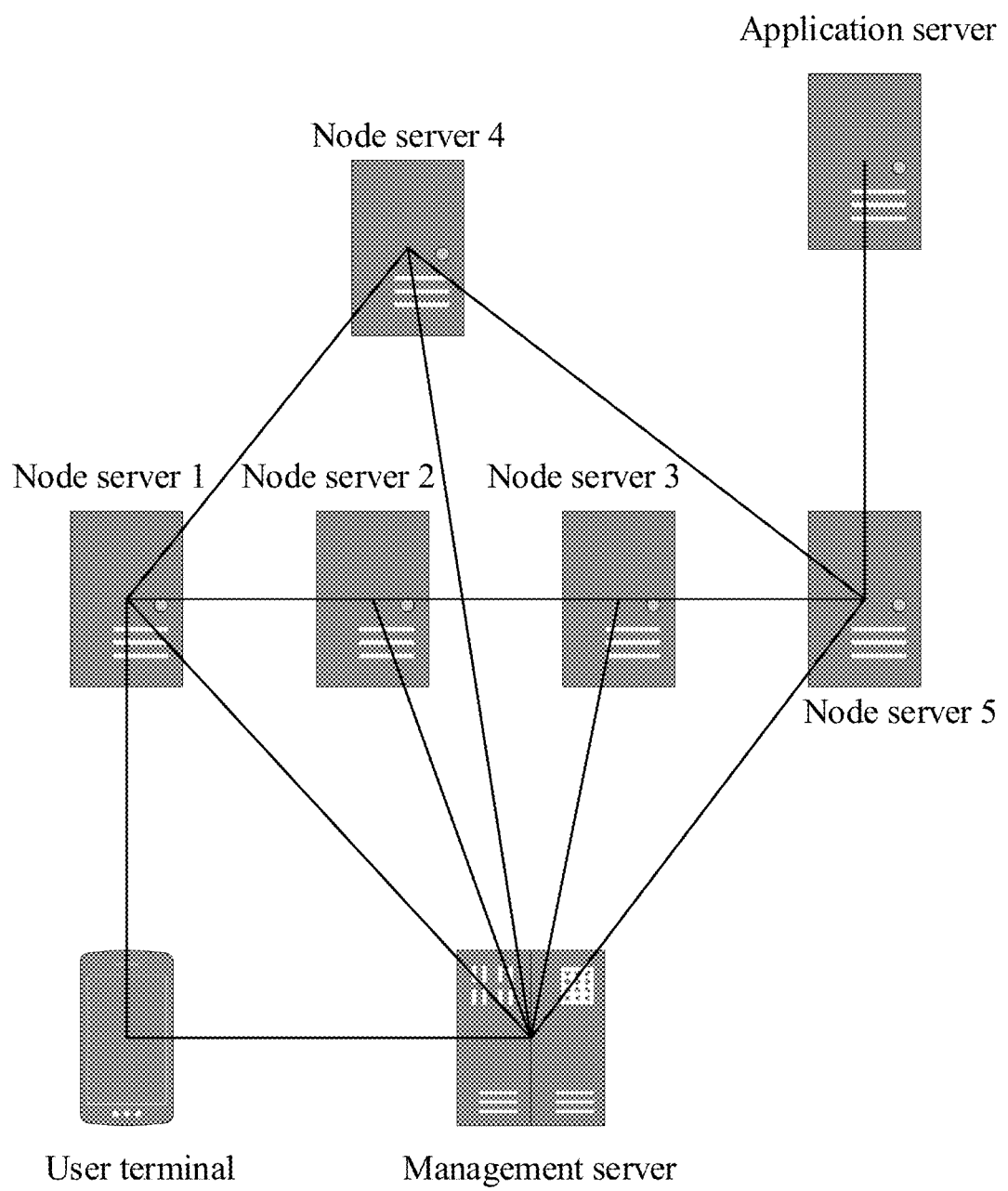
FIG. 2 illustrates a schematic view of a system architecture of CDN for live stream pushing according to embodiments of the present disclosure.

To better illustrate the data transmitting and receiving method provided by embodiments of the present disclosure, the present disclosure provides specific implementations applicable to live stream pushing in a content delivery network (CDN). FIG. 2 illustrates a schematic view of a system architecture of CDN for live stream pushing according to embodiments of the present disclosure. As shown in FIG. 2, the CDN for live stream pushing includes a user terminal, a management server, a plurality of node servers, and an application server. The user terminal may be a terminal installed with a host client, and the application server may be an application server of a live streaming platform. The user terminal may push live streaming video data to the application server through the CDN for live stream pushing illustrated in FIG. 2, such that a terminal installed with an audience client may acquire the live streaming video data from the application server.

Based on the CDN for live stream pushing illustrated in FIG. 2, live stream pushing may be performed. The present disclosure provides an accelerating method for live stream pushing. Optionally, a data message further includes an IP address of a destination node server. After the second device (node server 1) receives a data message sent by the first device (user terminal), the method further includes: determining, by the second device, a sending domain name link based on the IP address of the destination node server, where the sending domain name link is a path formed by a plurality of node servers of the CDN in which the destination node server is an end of the path; sending, by the second device, data messages to the destination node server through the sending domain name link, where the destination node server is configured to send the data messages to the application server.

Figure 3:
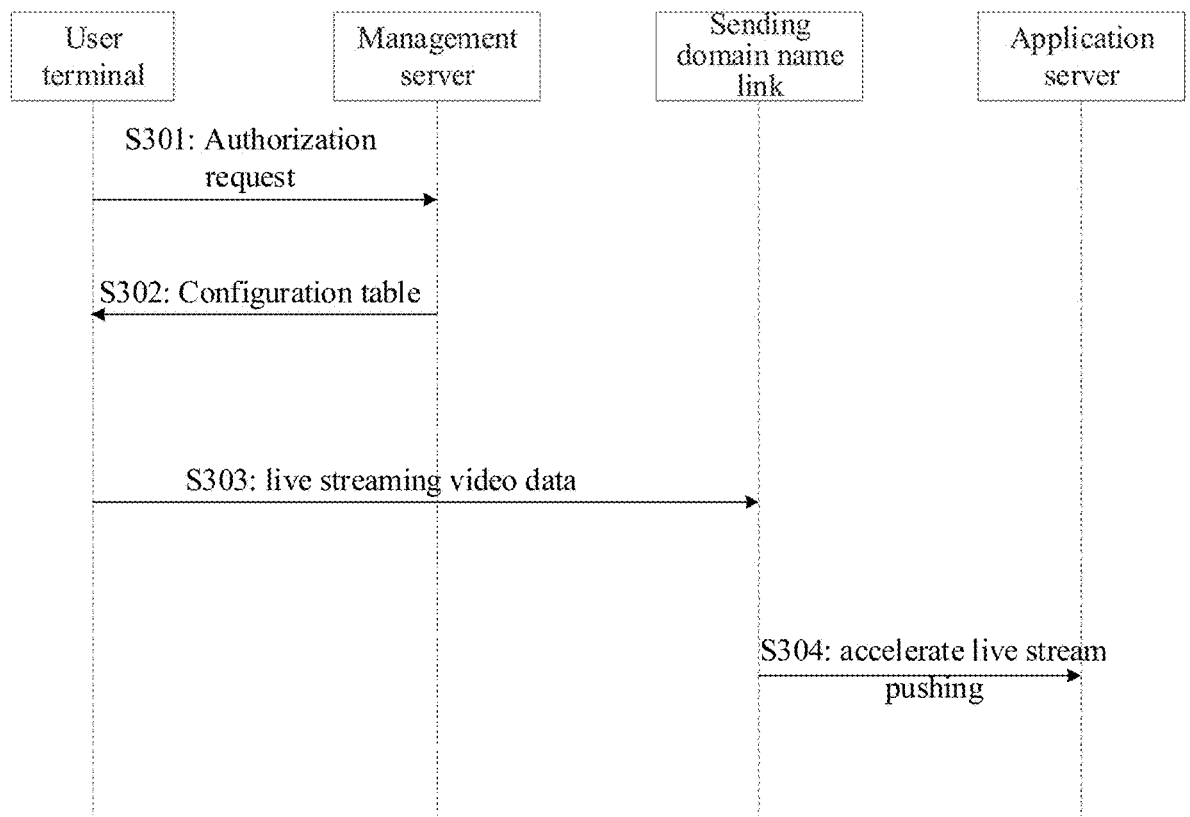
FIG. 3 illustrates a schematic view of an acceleration method for live stream pushing according to embodiments of the present disclosure.

FIG. 3 illustrates a schematic view of an acceleration method for live stream pushing according to embodiments of the present disclosure. As shown in FIG. 3, the method primarily includes following steps:

S301: sending, by a user terminal, an authorization request to a management server.

S302: receiving, by the management server, the authorization request, and authorizing, by the management server, the user terminal. When authorization is established, a configuration table is sent back to the user terminal.

S303: sending, by the user terminal, live streaming video data to an acceleration domain name link based on the configuration table.

S304, accelerating live stream pushing, by the acceleration domain name link, for the live streaming video data.

During specific implementation of S301, the user terminal may send the authorization request to the management server when the client is started, and may send authorization requests to the management server periodically during live streaming of a video. The authorization request sent by the user terminal to the management server may carry unique identification information corresponding to the client terminal installed by the user terminal, where the unique identification information enables the management server to determine the application server that the user terminal wants to access.

In the specific implementation of S302, authorization performed by the management server includes determining whether the application server determined based on the identification information in the authorization quest is authorized to accelerate live stream pushing. For example, if an application A does not purchase the live stream pushing acceleration service, after the management server determines that the application server determined using the identification information in the authorization request is the application server of the application A, the management server may refuse to provide an acceleration server for live steaming pushing, and will not return a configuration table to the user terminal. When the authorization is established, the configuration table sent by the management server to the user terminal may include the IP address of the node server 1 and the IP address of a destination node server. The node server 1 is a node server selected by the management server based on factors such as the location information of the user terminal and the network condition that matches the user terminal. The destination node server is a node server bound to the application server, such as the node server 5 in FIG. 2. The destination node server (e.g., the node server 5) may have a direct data communication relationship with the application server, and may send data directly to the application server. Optionally, the configuration table may further include authorization information of acceleration, such as the effective period of the live stream pushing acceleration service, and pre-configured requirement of an acceleration server for live stream pushing. The pre-configured requirement refers to that the developer of the application may only need to perform acceleration for live stream pushing on partial user terminals. For example, an application B may have purchased the live stream pushing acceleration service, and the application server of the application B may be located in the northern area. The application B may only provide live stream pushing acceleration service to the user terminals in the southern area. Accordingly, at S303, after the user terminal receives the configuration table, whether or not to accelerate the live streaming video data at the user terminal may be determined based on the authorization information of acceleration in the configuration table.

At S303, the acceleration domain name link refers to a data transmission link formed by a plurality of node servers, where the initial node server is node server 1 and the end node server is the destination node server (node server 5). The user terminal may send the live streaming video data and the IP address of the destination node server to the node server 1 based on the IP address of the node server 1 in the configuration table, and the node server 1 may determine the acceleration domain name link. Under this situation, the user terminal is the first device according to embodiments of the present disclosure, and the node server is the second device according to embodiments of the present disclosure. The user terminal and the node server may interact with each other using the data transmitting and receiving method according to embodiments of the present disclosure.

In the specific implementation of S304, acceleration on the live stream pushing by the acceleration domain name link is fulfilled by a plurality of node servers. As shown in FIG. 2, there are two paths from node server 1 to the node server 5, where path 1 is node server 1-node server 2-node server 3-node server 5, and path 2 is node server 1-node server 4-node server 5. The node server 1 may store delay information and operator information of the two paths, and the node server 1 may select a desired path as the acceleration domain name link. For example, if the node server 1 determines the path 2 as the acceleration domain name link, the node server 1 may forward data messages transmitted by the user terminal to the node server 4. The node server 4 may similarly store a path to the node server 5, and may eventually transmit the data messages to the node server 5. The node server 5 may be connected to an application server directly, and transmit the data messages to the application server. It should be understood that, FIG. 2 merely shows a simplified situation, and in practical applications, there are situations in which multiple paths exist between the node server 4 and the node server 5. Under this case, the node server 4 may select a desired path from the multiple paths and determine the node server next to itself. Further, the node server 4 may continue to forward the data messages to the next node server, and eventually transmit the data message to the node server 5.

As such, embodiments of the present disclosure provide a data transmitting method and receiving method, including: generating, by the first device, data messages based on a to-be-sent data stream; transmitting, by the first device, the data messages to a second device based on a packet transmission rate; recording, by the first device, the number of transmitted data messages; when the number of the transmitted data messages reaches a preset number for one batch, transmitting, by the first device, a verification message to the second device; receiving, by the first device, a verification acknowledgement returned by the second device, and determining, by the second device, a packet loss rate of the batch of data messages; updating, by the first device, the packet transmission rate based on packet loss rates of multiple batches of data messages. In embodiments of the present disclosure, the first device updates the packet transmission rate based on the packet loss rates of multiple batches of the data messages. The lower the packet loss rate, the better the network condition, and the higher the packet loss rate, the poorer the network condition. Because the packet loss rate reflects the current network condition to a great extent, based on the packet loss rate, the packet transmission rate may be updated to adjust the packet transmission rate of the first device to better accommodate the fluctuation of the network bandwidth, thus reducing the occurrence of the packet loss phenomenon. Further, the first device may perform verification with the second device batch by batch, which reduces the occupation of network resources in the verification process, thus increasing the network resource utilization rate.

Figure 4:
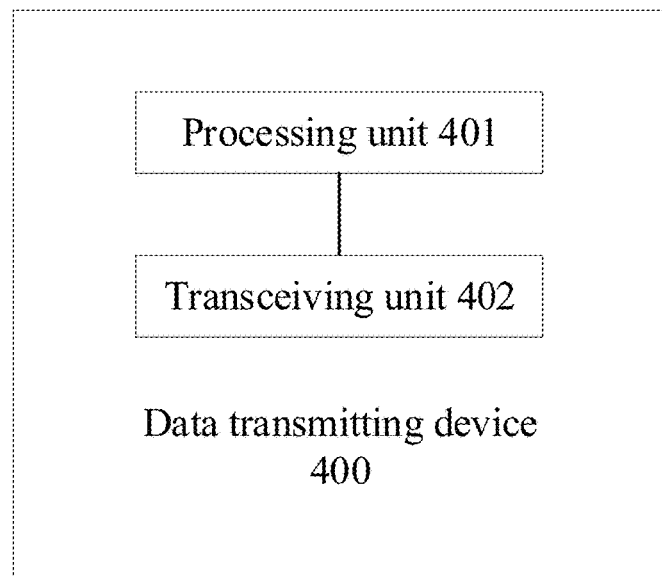
FIG. 4 illustrates a structural schematic view of a data transmitting device according to embodiments of the present disclosure.

Based on the same technical idea, embodiments of the present disclosure further provide a data transmitting device, and the data transmitting device may implement any aforementioned data transmitting method. FIG. 4 illustrates a structural schematic view of a data transmitting device according to embodiments of the present disclosure. As shown in FIG. 4, the data transmitting device 400 includes a processing unit 401 and a transceiving unit 402.

The processing unit 401 is configured to generate data messages based on a to-be-sent data stream.

The transceiving unit 402 is configured to send the data messages to the second device based on a packet transmission rate.

The processing unit 401 is further configured to record the number of transmitted data messages.

The processing unit 401 is further configured to, when the number of the transmitted data messages reaches a preset number to be a batch of data messages, send a verification message to the second device through the transceiving unit 402.

The processing unit 401 is further configured to receive a verification acknowledgement returned by the second device through the transceiving unit 402, and determine a packet loss rate of the batch of data messages.

The processing unit 401 is further configured to update the packet transmission rate based on packet loss rates of multiple batches of data messages.

Optionally, the processing unit 401 is configured to:

for each batch of data messages among the multiple batches of data messages, determine a round-trip time corresponding to the each batch of data messages based on a verification message and a verification acknowledgement to which the each batch of data messages correspond.

The processing unit 401 updates the packet transmission rate based on packet loss rates of certain batches of data messages among which a difference in round-trip time is within a preset value range.

Optionally, a data message includes a sending sequence number, and the verification acknowledgement includes sending sequence numbers of the corresponding batch of data messages received by the second device.

The processing unit 401 is configured to:

based on the sending sequence numbers of the corresponding batch of data messages received by the second device in the verification acknowledgement, determine the number of data messages not received by the second device in the corresponding batch of data messages;

determine a packet loss rate of the corresponding batch of data messages based on the number of data messages not received by the second device and the preset number; and update the packet transmission rate based on the packet loss rates of the multiple batches of data messages.

Optionally, the processing unit 401 is further configured to:

continue transmitting a next batch of data messages through the transceiving unit 402, where the next batch of data messages include transmitted data messages that have not been received by the second device.

Optionally, the processing unit 401 includes a sending buffer zone.

The processing unit 401 is further configured to:

confirm whether the second device has received the batch of data messages completely based on the sending sequence numbers of the batch of data messages received by the second device in the verification acknowledgement, where the preset batch of data messages are a preset number of data messages having consecutive sending sequence numbers.

If the second device has received the batch of data messages completely, the processing unit 401 deletes the preset batch of data messages from the sending buffer zone.

Figure 5:
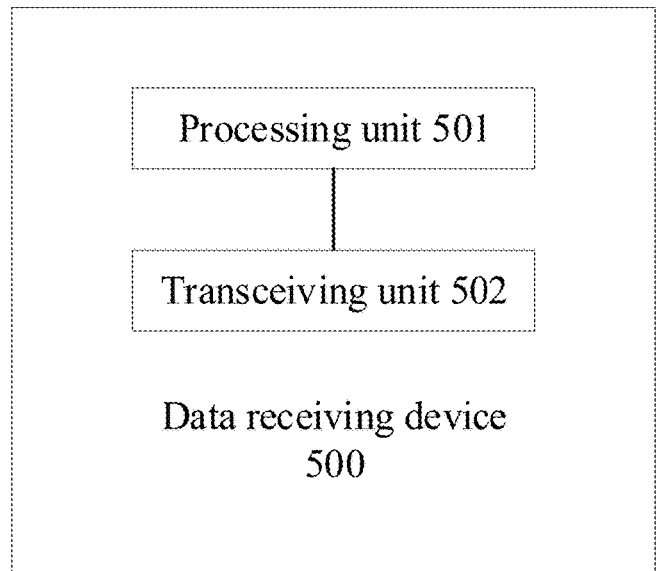
FIG. 5 illustrates a structural schematic view of a data receiving device according to embodiments of the present disclosure.

Based on the same technical idea, embodiments of the present disclosure further provide a data receiving device. The device receiving device may implement a data receiving method according to any of aforementioned embodiments. FIG. 5 illustrates a structural schematic view of a data receiving device according to embodiments of the present disclosure. As shown in FIG. 5, the data receiving device 500 includes a processing unit 501 and a transceiving unit 502.

The transceiving unit 502 is configured to receive data messages sent by a first device.

The processing unit 501 is configured to, when the transceiving unit 502 receives a verification message sent by the first device, send a verification acknowledgement to the first device through the transceiving unit 502.

Optionally, the processing unit 501 includes a receiving buffer zone, and a data message includes a sending sequence number.

The processing unit 501 is specifically configured to:

determine sending sequence numbers of data messages in the receiving buffer zone;

generate a verification acknowledgement, where the verification acknowledgement includes the sending sequence numbers of the data messages in the receiving buffer zone.

Optionally, the processing unit 501 further includes a processing buffer zone, and the processing unit 501 is further configured to:

when the receiving buffer zone caches a preset batch of data messages, transfer the preset batch of data messages from the receiving buffer zone to the processing buffer zone, where the preset batch of data messages are a preset number of data messages having consecutive sending sequence numbers;

perform a multithread process on the data messages in the processing buffer zone.

Optionally, the receiving device is a node server of the content delivery network (CDN), and a data message further includes an IP address of a destination node server.

The processing unit 501 is further configured to:

determine a sending domain name link based on the IP address of the destination node server, where the sending domain name link is a path formed by a plurality of node servers of the CDN in which the destination node server is an end of the path;

control the transceiving unit 502 to send the data messages to the destination node server through the sending domain name link, where the destination node server is configured to send the data messages to the application server.

It should be understood that, the division of aforementioned units are merely division of logic functions, and in practical implementation, the units may all or partially be integrated into a physical object, or may be physically separated. In embodiments of the present disclosure, the transceiving unit may be implemented by a transceiver, and the processing unit may be implemented by a processor.

Figure 6:
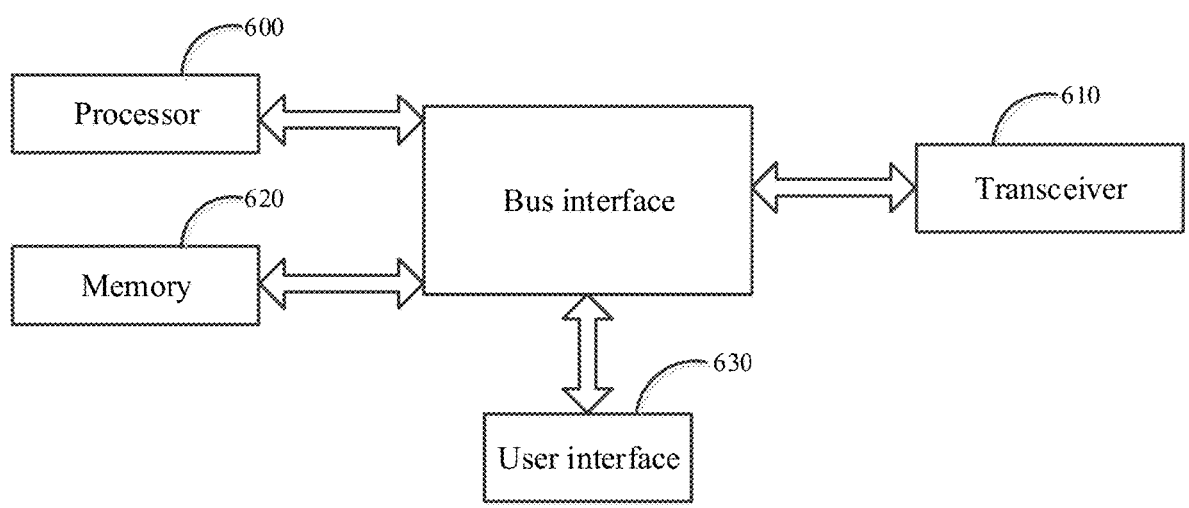
FIG. 6 illustrates a structural schematic view of a computing device according to embodiments of the present disclosure.

Based on the same technical idea, embodiments of the present disclosure provide a computing device. FIG. 6 illustrates a structural schematic view of a computing device according to embodiments of the present disclosure. As shown in FIG. 6, the computing device corresponds to a first device according to any of aforementioned embodiments. The computing device in FIG. 6 may include a processor 600, configured to read programs at a memory 620 to execute a following procedure:

generating data messages based on a to-be-sent data stream;

transmitting the data messages to a second device through a transceiver 610 based on a packet transmission rate;

recording the number of transmitted data messages;

when the number of the transmitted data messages reaches a preset number for a batch of data messages, transmitting a verification message to the second device through the transceiver 610;

receiving a verification acknowledgement returned by the second device through the transceiver 610, and determining a packet loss rate of the batch of data messages;

updating the packet transmission rate based on packet loss rates of multiple batches of data messages.

Optionally, the processor 600 is specifically configured to:

for each batch of data messages among the multiple batches of data messages, determine a round-trip time corresponding to the each batch of data messages based on a verification message and a verification acknowledgement to which the each batch of data messages correspond;

update the packet transmission rate based on packet loss rates of certain batches of data messages among which a difference in round-trip time is within a preset value range.

Optionally, a data message includes a sending sequence number, and the verification acknowledgement includes sending sequence numbers of the corresponding batch of data messages received by the second device.

The processor 600 is specifically configured to:

based on the sending sequence numbers of the corresponding batch of data messages received by the second device in the verification acknowledgement, determine the number of data messages not received by the second device in the corresponding batch of data messages;

determine a packet loss rate of the corresponding batch of data messages based on the number of data messages not received by the second device and the preset number;

update the packet transmission rate based on the packet loss rates of the multiple batches of the data message.

Optionally, the processor 600 is further configured to:

continue transmitting a next batch of data messages through the transceiver 610, where the next batch of data messages include transmitted data messages that have not been received by the second device.

Optionally, the processor 600 includes a sending buffer zone, and the processor 600 is further configured to:

confirm whether the second device has received the batch of data messages completely based on the sending sequence numbers of the batch of data messages received by the second device in the verification acknowledgement, where the preset batch of data messages are a preset number of data messages having consecutive sending sequence numbers;

if the second device has received the batch of data messages completely, delete the batch of data messages from the sending buffer zone.

Further, in FIG. 6, the bus interface may include any number of buses and bridges that are coupled to each other. Specifically, the one or more processors represented by the processor 600 and the various circuits of memories represented by the memory 620 may be connected. The bus interface may further connect components such as a peripheral device, a voltage regulator, and a power management circuit to other circuits, which are known to ordinarily skilled in the art, and the present disclosure is not limited thereto. The bus interface provides an interface. The transceiver 610 may include various components, i.e., a sender and a receiver, providing units that are configured to communicate with other devices at a transmission medium. For different computing devices, the user interface 630 may be an interface that connects to an internal or external device. The connected device includes but is not limited to a small keyboard, a display, a loudspeaker, a microphone, and a joystick, etc.

The processor 600 is responsible for managing the bus interface and ordinary processing, and the memory 620 may store data used by the processor 600 when execute operations.

Optionally, the processor 600 may be a CPU (central processing unit), an ASIC (Application Specific Integrated Circuit), a FPGA (Field-Programmable Gate Array), or a CPLD (Complex Programmable Logic Device).

Figure 7:
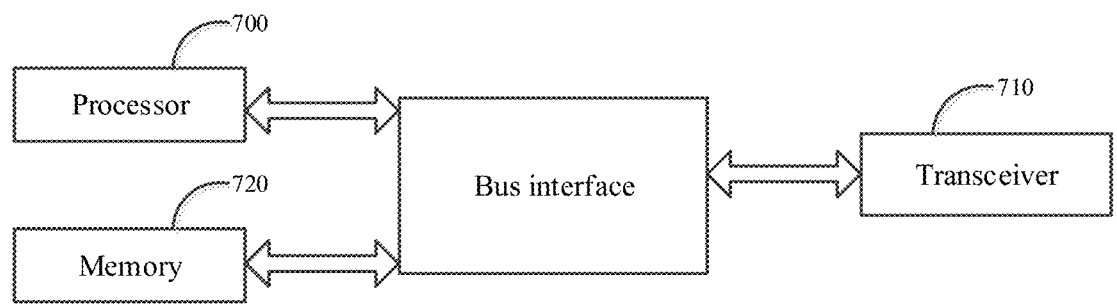
FIG. 7 illustrates a structural schematic view of a computing device according to embodiments of the present disclosure.

Based on the same technical idea, embodiments of the present disclosure provide another computing device. FIG. 7 illustrates a structural schematic view of a computing device according to embodiments of the present disclosure. As shown in FIG. 7, the computing device corresponds to the second device according to any aforementioned embodiment. The computing device in FIG. 7 may include a processor 700, configured to read programs in the memory 720, to execute the following procedure:

receiving data messages sent by a first device through a transceiver 710;

when receiving a verification message sent by the first device, returning a verification acknowledgement to the first device through the transceiver 710.

Optionally, the processor 700 includes a receiving buffer zone, and a data message includes a sending sequence number.

The processor 700 is specifically configured to:

determine sending sequence numbers of data messages in the receiving buffer zone;

generate a verification acknowledgement, where the verification acknowledgement includes the sending sequence numbers of the data messages in the receiving buffer zone.

Optionally, the processor 700 further includes a processing buffer zone, and the processor 700 is further configured to:

when the receiving buffer zone caches a preset batch of data messages, transfer the preset batch of data messages from the receiving buffer zone to the processing buffer zone, where the preset batch of data messages are a preset number of data messages having consecutive sending sequence numbers;

perform a multithread process on the data messages in the processing buffer zone.

Optionally, the computing device is a node server in the content delivery network, and the data message further includes an IP address of the destination node server.

The processor 700 is further configured to:

determine a sending domain name link based on the IP address of the destination node server, where the sending domain name link is a path formed by a plurality of node servers of the CDN in which the destination node server is an end of the path;

send the data messages to the destination node server through the sending domain name link, where the destination node server is configured to send the data messages to an application server.

Based on the same technical idea, embodiments of the present disclosure provide a non-volatile computer-readable storage medium, the non-volatile computer-readable storage medium stores computer-executable instructions, and the computer-executable instructions are configured to enable the computer to execute any of aforementioned data transmitting methods, and/or, any of aforementioned data receiving methods.

The non-volatile computer-readable storage medium may be any medium or data storage device accessible by the computer, including but is not limited to magnetic memory (e.g., floppy disc, hard disc, magnetic tape, magnetic optical disc, etc.), optical memory (e.g., CD, DVD, BD, HVD, etc.), and semiconductor memory (e.g., ROM, EPROM, EEPROM, NAND FLASH, SSD), etc.

Though preferred embodiments of the present disclosure are provided, those skilled in the relevant art shall make additional changes or modifications to these embodiments given basic creative concepts. Thus, appended claims are intended to include preferred embodiments and all changes and modifications falling within the scope of the present disclosure.

Obviously, those skilled in the relevant art shall make various alterations and derivations without departing away from the spirit and scope of the present disclosure. All these alterations and deviations of the present disclosure shall fall within the scope defined by the claims and equivalent techniques, and the present disclosure is intended to include all these alterations and deviations.

What is claimed is:

1. A data transmitting method, comprising:
generating, by a first device, data messages based on a to-be-sent data stream;
transmitting, by the first device, the data messages to a second device based on a packet transmission rate;
recording, by the first device, a number of transmitted data messages;
when the number of the transmitted data messages reaches a preset number to be a batch of data messages, transmitting, by the first device, a verification message to the second device;
receiving, by the first device, a verification acknowledgement returned by the second device;
determining, by the first device, a packet loss rate of the batch of data messages;
selecting, by the first device, packet loss rates of partial batches of data messages from packet loss rates of multiple batches of data messages, and updating, by the first device, the packet transmission rate based on the packet loss rates of partial batches of data messages;
wherein the selecting, by the first device, packet loss rates of partial batches of data messages from packet loss rates of multiple batches of data messages, and updating, by the first device, the packet transmission rate based on the packet loss rates of partial batches of data messages comprises:
for each batch of data messages among the multiple batches of data messages, determining, by the first device, whether a difference between the packet loss rate of the batch of data messages and a packet loss rate of an adjacent batch of data messages exceeds a preset threshold;
updating, by the first device, the packet transmission rate based on packet loss rates of certain batches of data messages among which a difference in packet loss rate does not exceed the preset threshold.

2. The method according to claim 1, wherein the selecting, by the first device, packet loss rates of partial batches of data messages from packet loss rates of multiple batches of data messages, and updating, by the first device, the packet transmission rate based on the packet loss rates of partial batches of data messages comprises:
for each batch of data messages among the multiple batches of data messages, determining, by the first device, a round-trip time corresponding to the each batch of data messages based on a verification message and a verification acknowledgement to which the each batch of data messages correspond;
updating, by the first device, the packet transmission rate based on packet loss rates of certain batches of data messages among which a difference in round-trip time is within a preset value range.

3. The method according to claim 1, wherein:
each of the data messages includes a sending sequence number, and the verification acknowledgement includes sending sequence numbers of the batch of data messages received by the second device; and the updating, by the first device, the packet transmission rate based on packet loss rates of multiple batches of data messages further includes:
based on the sending sequence numbers of the batch of data messages received by the second device in the verification acknowledgement, determining, by the first device, a number of data messages not received by the second device in the batch of data messages,
determining, by the first device, a packet loss rate of the batch of data messages based on the preset number and the number of data messages not received by the second device, and
updating, by the first device, the packet transmission rate based on the packet loss rates of the multiple batches of data messages.

4. The method according to claim 3, further comprising:
continuing transmitting, by the first device, a next batch of data messages, wherein the next batch of data messages include transmitted data messages that have not been received by the second device.

5. The method according to claim 4, wherein:
the first device includes a sending buffer zone; and
after receiving, by the first device, the verification acknowledgement returned by the second device, the method further includes:
confirming, by the first device, whether the second device has received the batch of data messages completely based on the sending sequence numbers of the batch of data messages received by the second device in the verification acknowledgement, wherein the preset batch of data messages are a preset number of data messages having consecutive sending sequence numbers, and
if the second device has received the batch of data messages completely, deleting, by the first device, the batch of data messages from the sending buffer zone.

6. The method according to claim 1, wherein the to-be-sent data stream is live streaming video data.

7. A data receiving method, comprising:
receiving, by a second device, data messages sent by a first device; and
when the second device receives a verification message sent by the first device, sending, by the second device, a verification acknowledgement to the first device;
wherein, the data messages is generated by the first device based on a to-be-sent data stream and the data messages are transmitted from the first device to the second device based on a packet transmission rate;
the first device records a number of transmitted data messages;
when the number of the transmitted data messages reaches a preset number to be a batch of data messages, the first device transmits the verification message to the second device;
the first device receives the verification acknowledgement returned by the second device;
the first device determines a packet loss rate of the batch of data messages;
the first device selects packet loss rates of partial batches of data messages from packet loss rates of multiple batches of data messages, and updates the packet transmission rate based on the packet loss rates of partial batches of data messages;
wherein the first device selects packet loss rates of partial batches of data messages from packet loss rates of multiple batches of data messages, and updates the packet transmission rate based on the packet loss rates of partial batches of data messages comprises:
  for each batch of data messages among the multiple batches of data messages, the first device determines whether a difference between the packet loss rate of the batch of data messages and a packet loss rate of an adjacent batch of data messages exceeds a preset threshold;
the first device updates the packet transmission rate based on packet loss rates of certain batches of data messages among which a difference in packet loss rate does not exceed the preset threshold.

8. The method according to claim 7, wherein:
the second device includes a receiving buffer zone, and each of the data messages includes a sending sequence number; and
the when the second device receives the verification message sent by the first device, sending, by the second device, the verification acknowledgement to the first device, includes:
  determining, by the second device, sending sequence numbers of data messages in the receiving buffer zone, and
  generating, by the second device, the verification acknowledgement, wherein the verification acknowledgement includes the sending sequence numbers of the data messages in the receiving buffer zone.

9. The method according to claim 8, wherein:
the second device further includes a processing buffer zone; and
the generating, by the second device, the verification acknowledgement, further includes:
  when the receiving buffer zone caches a preset batch of data messages, transferring, by the second device, the preset batch of data messages from the receiving buffer zone to the processing buffer zone, wherein the preset batch of data messages are a preset number of data messages having consecutive sending sequence numbers, and
  performing a multithread process, by the second device, on the data messages in the processing buffer zone.

10. The method according to claim 7, wherein:
the second device is a node server of a content delivery network (CDN), and each of the data messages further includes an IP address of a destination node server; and
after receiving, by the second device, the data messages sent by the first device, the method further includes:
  determining, by the second device, a sending domain name link based on the IP address of the destination node server, wherein the sending domain name link is a path formed by a plurality of node servers of the CDN in which the destination node server is an end of the path, and
  sending, by the second device, the data messages to the destination node server through the sending domain name link, wherein the destination node server is configured to send the data messages to an application server.

11. A computing device, comprising:
at least one processor; and
a memory coupled to the at least one processor, wherein the memory stores instructions executable by the at least one processor, and the instructions are executed by the at least one processor to allow the at least one processor to execute a data transmitting method, comprising:
generating data messages based on a to-be-sent data stream;
transmitting the data messages to a second device through a transceiver based on a packet transmission rate;
recording a number of transmitted data messages;
when the number of the transmitted data messages reaches a preset number to be a batch of data messages, transmitting a verification message to the second device through the transceiver;
receiving a verification acknowledgement returned by the second device through the transceiver;
determining a packet loss rate of the batch of data messages;
selecting packet loss rates of partial batches of data messages from packet loss rates of multiple batches of data messages; and
updating the packet transmission rate based on the packet loss rates of partial batches of data messages;
wherein the packet loss rates of partial batches of data messages from packet loss rates of multiple batches of data messages; and updating the packet transmission rate based on the packet loss rates of partial batches of data messages comprises:
  for each batch of data messages among the multiple batches of data messages, determining whether a difference between the packet loss rate of the batch of data messages and a packet loss rate of an adjacent batch of data messages exceeds a preset threshold;
  updating the packet transmission rate based on packet loss rates of certain batches of data messages among which a difference in packet loss rate does not exceed the preset threshold.

12. The computing device according to claim 11, wherein the at least one processor is further configured to:
for each batch of data messages among the multiple batches of data messages, determine a round-trip time corresponding to the each batch of data messages based on a verification message and a verification acknowledgement to which the each batch of data messages correspond; and
update the packet transmission rate based on packet loss rates of certain batches of data messages among which a difference in round-trip time is within a preset value range.

13. The computing device according to claim 11, wherein:
each of the data messages includes a sending sequence number;
the verification acknowledgement includes sending sequence numbers of the batch of data messages received by the second device; and
the at least one processor is further configured to:
  based on the sending sequence numbers of the batch of data messages received by the second device in the verification acknowledgement, determine a number of data messages not received by the second device in the batch of data messages,
  determine a packet loss rate of the batch of data messages based on the preset number and the number of data messages not received by the second device, and
  update the packet transmission rate based on the packet loss rates of the multiple batches of data messages.

14. The computing device according to claim 13, wherein the at least one processor is further configured to:
continue transmitting a next batch of data messages, wherein the next batch of data messages include transmitted data messages that have not been received by the second device.

15. The computing device according to claim 14, wherein:
the at least one processor includes a sending buffer zone, and is further configured to:
confirm whether the second device has received the batch of data messages completely based on the sending sequence numbers of the batch of data messages received by the second device in the verification acknowledgement, wherein the preset batch of data messages are a preset number of data messages having consecutive sending sequence numbers, and
if the second device has received the batch of data messages completely, delete the batch of data messages from the sending buffer zone.

16. The computing device according to claim 11, wherein:
the second device is a node server of a content delivery network (CDN);
each of the data messages further includes an IP address of a destination node server; and
the second device is further configured to:
determine a sending domain name link based on the IP address of the destination node server, wherein the sending domain name link is a path formed by a plurality of node servers of the CDN in which the destination node server is an end of the path, and
send the data messages to the destination node server through the sending domain name link, wherein the destination node server is configured to send the data messages to an application server.

* * * * *